Sept. 27, 1966  D. D. MULLIN  3,276,017
INFLATABLE SUPPORT STRUCTURE
Filed Oct. 18, 1961  5 Sheets-Sheet 1

INVENTOR.
DOYLE D. MULLIN
BY
*William C. Babcock*
ATTORNEY

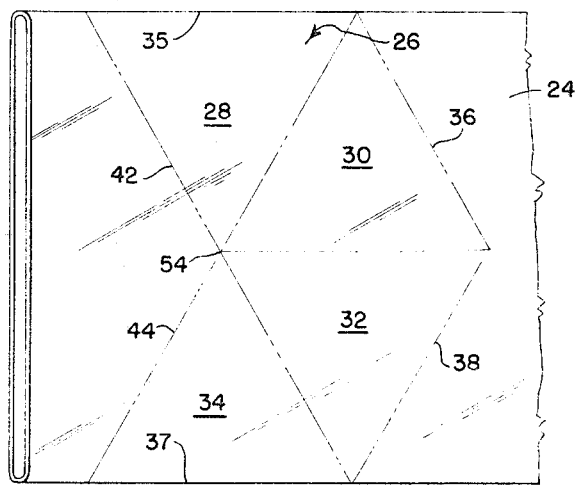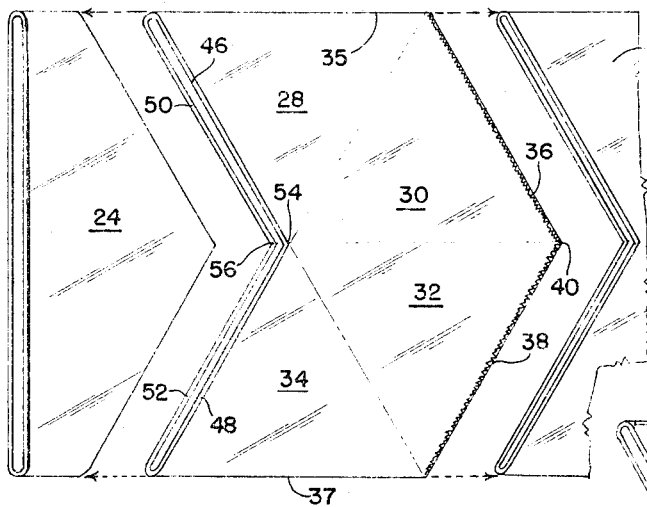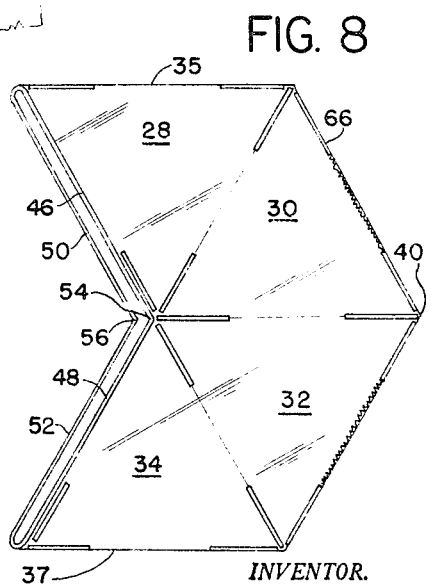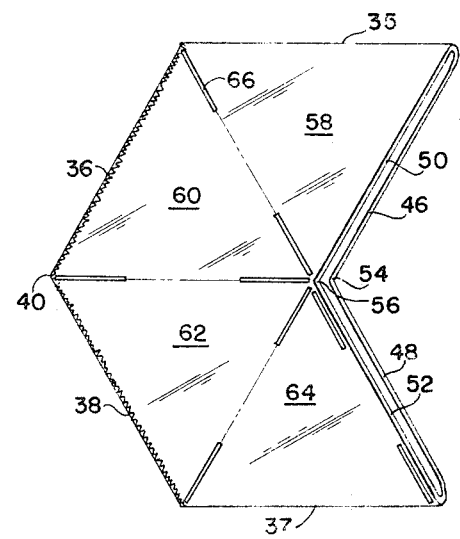

Sept. 27, 1966    D. D. MULLIN    3,276,017
INFLATABLE SUPPORT STRUCTURE
Filed Oct. 18, 1961    5 Sheets-Sheet 3
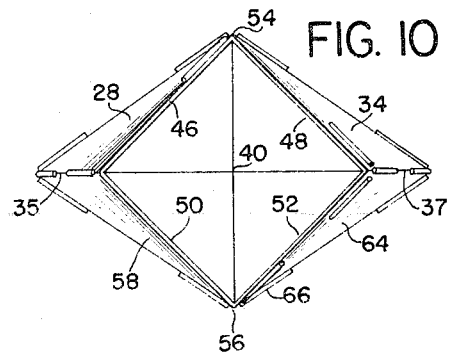
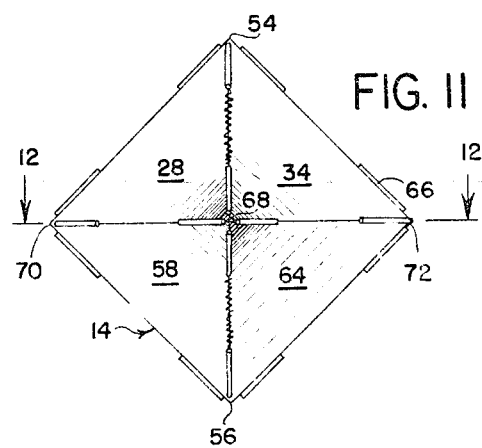
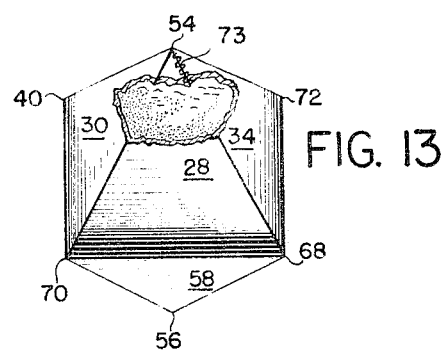
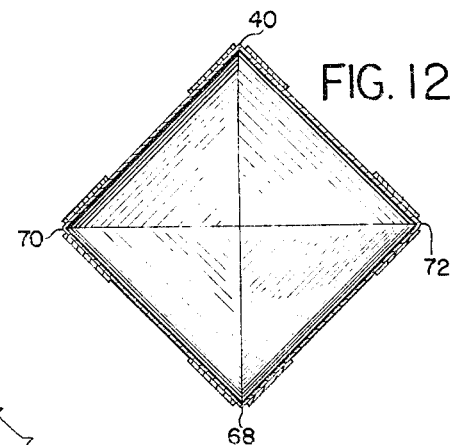
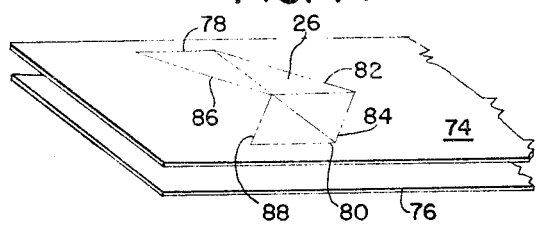
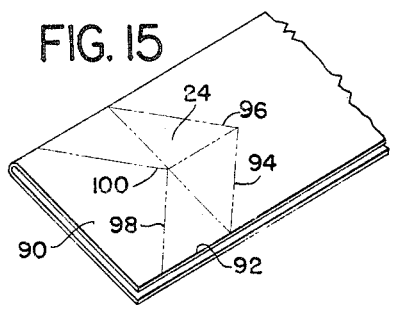
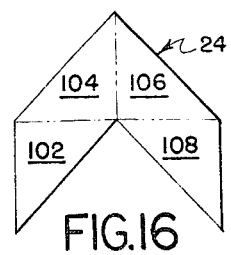
INVENTOR.
DOYLE D. MULLIN
BY William C. Babcock
ATTORNEY Sept. 27, 1966  D. D. MULLIN  3,276,017
INFLATABLE SUPPORT STRUCTURE
Filed Oct. 18, 1961  5 Sheets-Sheet 4

INVENTOR.
DOYLE D. MULLIN
BY William C. Babcock
ATTORNEY

Sept. 27, 1966      D. D. MULLIN      3,276,017
INFLATABLE SUPPORT STRUCTURE
Filed Oct. 18, 1961      5 Sheets-Sheet 5
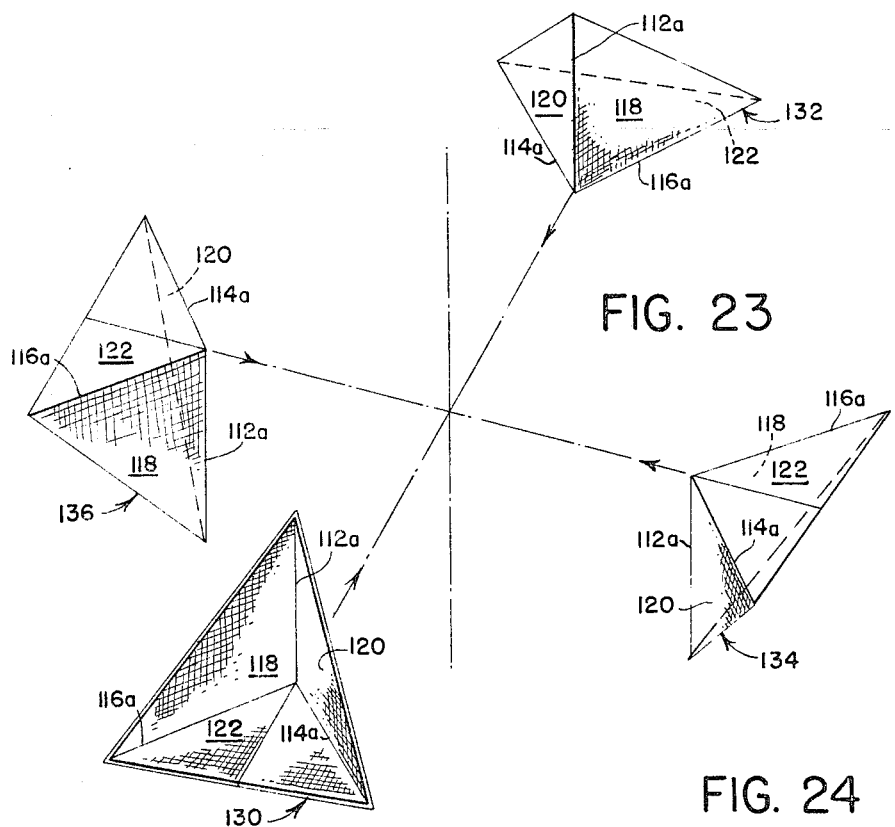
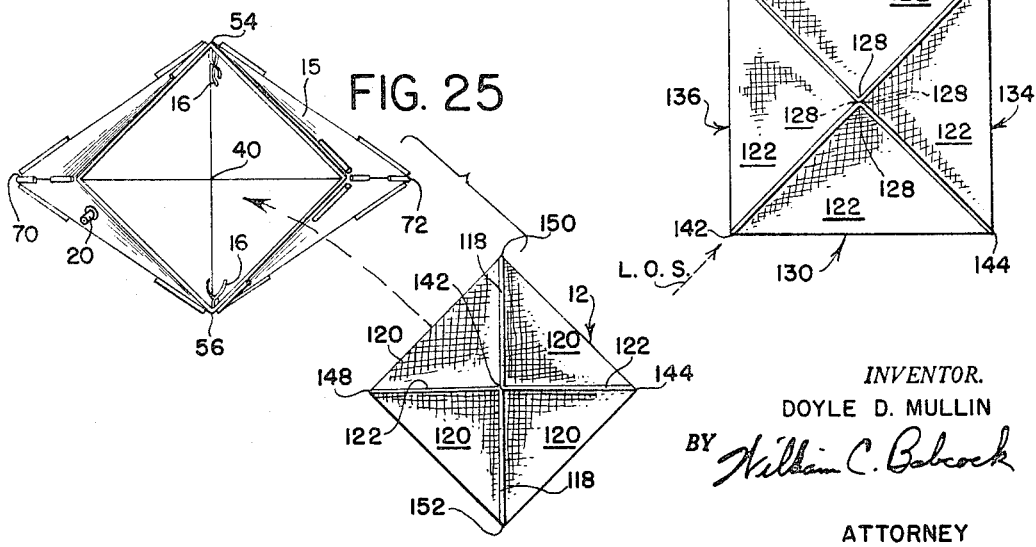
INVENTOR.
DOYLE D. MULLIN
BY *William C. Babcock*
ATTORNEY United States Patent Office 3,276,017
Patented Sept. 27, 1966

3,276,017
INFLATABLE SUPPORT STRUCTURE
Doyle D. Mullin, Minneapolis, Minn., assignor to General Mills, Inc., a corporation of Delaware
Filed Oct. 18, 1961, Ser. No. 145,832
3 Claims. (Cl. 343—18)

The present invention relates to containers, and more particularly to an inflatable container or structure for containing and supporting a radar corner reflector.

Corner reflectors comprised of a plurality of radar reflecting surfaces are used for identifying the position of a person or an object which is in distress or lost on land or at sea. These types of reflectors are used so that the lost person or object can be located by means of a search party in an airplane, ship, or from the ground. In addition, by floating a plurality of such reflectors in a body of water or in the atmosphere, or by orbiting them in space, by suitable means, they might be effectively used as a decoy system. As used herein, the term space excludes the atmosphere surrounding the earth.

Corner reflectors of this nature have been constructed by connecting together a number of plane surfaces made of rigid material such as sheet metal; by connecting together a number of panels made of a flexible, collapsible, light-weight material having a reflecting material adhered thereto; or by connecting together a number of panels made of a flexible, collapsible metallic fabric. The latter two types of reflectors require the use of a rigid framework or other support structure for maintaining the reflector in a proper reflecting condition. In addition, if the reflector is used on water, some means must be provided for maintaining the reflector above the surface of the water.

Inflatable structures have been effectively used to suspend and support a radar reflector in various types of environments. One commonly used type of inflatable structure is an inflatable spherical balloon having means for suspending the reflector inside of it. Such a balloon when inflated with gas exerts a uniform radial tension, which is an important factor in reducing the number of surface imperfections. However, the spherical balloon is not entirely satisfactory. One disadvantage of using such a balloon as a support structure is that it is difficult to construct, therefore resulting in relatively high construction costs. For example, one manner of making a spherical balloon is by securing together a plurality of gores which have curved edges. These types of gores are difficult to join together because proper positioning of adjacent gores during the connecting process is often difficult to attain. Another disadvantage of a spherical balloon is that a relatively large volume of gas is required to inflate it; therefore, this type of unit is best suited for small sizes.

Accordingly one object of the present invention is to provide an improved container.

Another object is to provide an improved container having a plurality of plane surfaces intersecting with each other to form a plurality of straight edges.

Still another object is to make a container of economical and light-weight material by a method which is rapid and simple, thereby reducing the cost of manufacture, and which is suitable for mass production of containers or for the production of single containers as the demand arises.

A further object is to provide an inflatable structure for supporting a radar corner reflector.

A still further object is to provide an inflatable support structure for a corner reflector which requires a minimum amount of inflation media to inflate and which is easy and inexpensive to construct.

Still another object relates to an improved method of making a radar reflector unit which includes a corner reflector and an inflatable structure for supporting the reflector.

Preferably, the radar reflector unit of this invention is comprised of a flexible corner reflector and an inflatable container or support structure. The container is formed from a collapsible, radar-transparent, gas impervious material and is used to support the corner reflector and maintain it in a distended condition during use. The container is so constructed that only straight seams and edges, rather than curved seams result, this provides a container which is easy, simple, and inexpensive to make. When filled with an inflation medium, the container assumes the shape of a polyhedron having a plurality of equilateral triangular-shaped surfaces. The corner reflector is comprised of a plurality of reflecting surfaces which effectively reflect transmitted radio microwaves to the receiver of a radio echo detection set. The reflector is suspended within the container in such a manner that when the container is filled with the inflation medium, each corner of the reflector is enclosed by a triangular surface of the container.

Other objects and advantages of the invention will become apparent from a consideration of the following specification and accompanying drawings, wherein:

FIG. 6 is a perspective of a length of tubular-shaped material having a pattern of a blank of the container thereon;

FIG. 7 is a perspective showing one end of the blank cut and sealed, and the other end of the blank cut from the tubular-shaped material;

FIG. 8 is a perspective showing one surface of the blank after load bearing rods or battens have been attached;

FIG. 9 is a perspective showing the opposite surface of the blank illustrated in FIG. 8;

FIG. 10 is a perspective of the container after it has been partially folded;

FIG. 11 illustrates the container after it has been folded and sealed;

FIG. 12 is a cross-sectional view taken along line 12—12 of FIG. 11;

FIG. 13 illustrates a perspective view of the sealed container shown in FIG. 11, with part of the container broken away to illustrate the container filled with a medium;

FIG. 14 illustrates a modification whereby the blank is formed from two separate sheets of material;

FIG. 15 illustrates a further modification whereby the blank is formed from a single sheet of folded material;

FIG. 16 illustrates a modified form of a blank for making the container;

FIG. 23 is a perspective showing four trihedrons in an exploded condition;

FIG. 24 is a top elevational view of the corner reflector in an assembled condition; and FIG. 25 is a perspective showing the container or support structure in a partially closed condition and having the corner reflector extracted therefrom.

Figure 1:
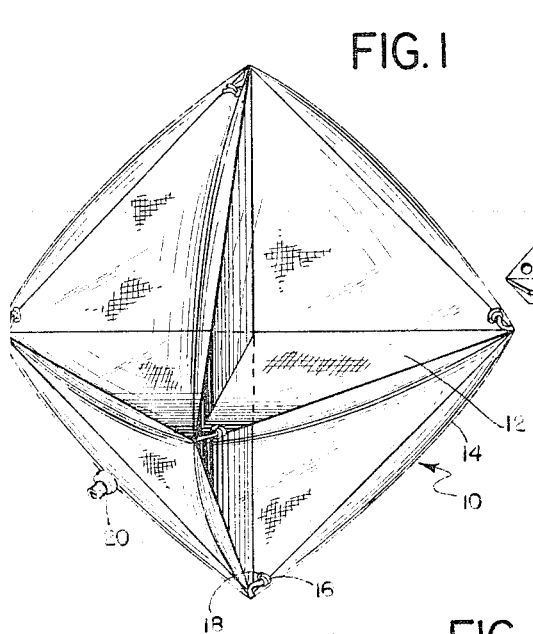
FIGURE 1 is a perspective view of the radar reflector unit which includes the corner reflector and the inflatable container which supports the corner reflector.

FIGURE 1 illustrates a radar reflector unit, designated generally by reference numeral 10, which includes a corner reflector 12, and an inflatable structure or container 14 for supporting the reflector 12. The reflector 12 is suspended within the container 14 by means of tie-strings 16 which are connected to grommets 18 located in the reflector 12. The container 14 is inflated with a gaseous medium by means of a valve 20. In this connection, the particular type of inflation medium and inflation device used might vary. For example, a pressurized container (not shown) containing a gaseous medium might be used; or if desired, the structure might be inflated by using a sublimating substance.

Figure 2:
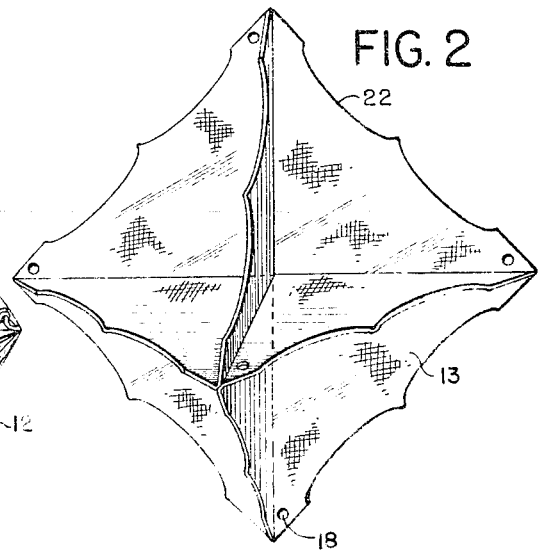
FIG. 2 is a perspective view illustrating a modified embodiment of the corner reflector.

The corner reflector illustrated in FIGURE 2 shows a modified form of a corner reflector 13 having a plurality of catenary portions 22 removed therefrom; this feature aids in filling the container 14 uniformly with gas during inflation.

Figure 3:
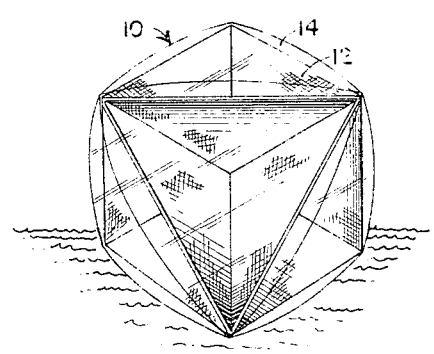
FIG. 3 is a perspective view of the radar reflector unit shown in FIGURE 1, fully erected and inflated with a gaseous medium, floating upon the surface of a body of water.

In FIGURE 3, the radar reflecting unit 10 of FIGURE 1 is shown fully inflated and floating in a body of water. It is pointed out however, that the invention might be used in the atmosphere as well. For example, a plurality of the reflecting units might be dropped from a space vehicle, and as the unit floats toward the earth, it would serve as an effective decoy system. In addition, it is conceivable that a plurality of such units might be orbited in space.

FIGURE 6 illustrates a length of tubular lay-flat material 24. This material may be of any suitable type, but a thermoplastic is preferred, such as polyethylene which is a non-extensible material, and for convenience, the specification will refer to the container material as polyethylene or thermoplastic. Although polyethylene and other thermoplastics may be capable of being stretched slightly with the application of forces, they may be regarded as being non-extensible as contrasted to material such as rubber. As noted in FIGURE 6, the pattern of a blank 26 has been laid out on the material. The blank 26 is comprised of four equilateral-shaped triangles 28, 30, 32, and 34, and has two side edges 35 and 37.

The container blank 26 is separated from the tubular material 24 by simultaneously cutting and sealing along the lines or edges 36 and 38. This process may be accomplished by the use of any suitable well known heat sealing equipment and will not be illustrated and described in detail. The edges 36 and 38 meet at a point 40 to form a first angle as shown in FIGURE 7. A second cut is made along the lines 42 and 44, thereby forming four edges 46, 48, 50, and 52. The edges 46 and 48 meet at a point 54 to form a second angle, and the edges 50 and 52 meet at a point 56 to form an angle identical to that formed by edges 46 and 48. Edges 46 and 50, and 48 and 52, are longitudinally spaced from and parallel to the edges 36 and 38 respectively. The container blank 26 has a top surface comprised of the four equilateral triangles 28, 30, 32, and 34, and a bottom surface comprised of four equilateral triangles 58, 60, 62, and 64 (note FIGURE 9 which illustrates the bottom surface of the blank).

In order to reinforce the container, a plurality of rods or battens designated generally by reference numeral 66, are attached to each corner of the container. Preferably, four of the rods 66 are attached to each corner of the blank 26, as illustrated in FIGURES 8 and 9. FIGURE 8 illustrates a majority of the rods as being attached to the top surface; however, the placement of the rods on a particular surface is immaterial, and it is largely a matter of convenience and choice as to how and where the rods are to be attached, the prime concern being that each corner of the resultant container should have four of the rods attached thereto. The rods 66 are attached by any convenient method, such as heat sealing directly to the surface of the blank, by the use of an adhesive, or the like. It is also envisioned that the rods 66 might be assembled into units of four prior to attachment, and thereafter each unit attached to the six corners of the container, after the container construction has been completed.

The blank 26 is formed into a polyhedron having a plurality of equilateral triangular-shaped surfaces by folding the blank about the points 54 and 56 and causing them to separate from each other as shown in FIGURE 10. The blank is folded until the edge 46 of surface 28, and the edge 50 of surface 58 abut against the edge 48 of surface 34 and the edge 52 of surface 64 respectively. The side edges 35 and 37 meet at a point to form a corner designated by reference numeral 68. The container, designated generally by reference numeral 14, is thereafter completed by sealing the edges 46 and 50 to the edges 48 and 52 respectively (note FIGURE 11, which shows the completed container). By using the blank illustrated in FIGURE 6, the completed container forms an octahedron, having eight equilateral triangular-shaped surfaces, two apices 54 and 56, and four corners 40, 68, 70 and 72. Note that only two continuous sealed edges are required, one edge being that formed by sealing along the edges 36 and 38, and the other edge being that formed by sealing the edges 46 and 50 to edges 48 and 52 respectively. As illustrated in FIGURE 12, a plane drawn through the four corners of the container describes a square, and a diagonal connecting the corners 40 and 68 is substantially equal in length to a diagonal connecting the corners 70 and 72, as well as a diagonal connecting the apices 54 and 56.

FIGURE 13 illustrates a perspective view of the container shown in FIGURE 11, filled with a medium but without the rods or battens 66. The container is filled through an opening 73, which is thereafter sealed shut again.

The above description describes one method of forming a container. It is not intended to be limited to the specific method described, as it is envisioned that some of the steps involved might be performed in a different sequence. For example, while it is preferred that the initial cutting and sealing operation be simultaneously performed in order to save steps, it is also possible to perform the cutting operation first, and thereafter join the two edges together by sealing or vice versa.

FIGURE 14 illustrates a modified method of forming the container. Two sheets of material 74 and 76 are used in lieu of the tubular material 24 described above and illustrated in FIGURE 6. The sheet 74 is superimposed over the sheet 76, and the blank 26 is thereafter obtained from these sheets. The specific method of forming the container might vary, dependent upon existing conditions, available equipment, and the like. One method of forming the container might involve the steps of simultaneously cutting and sealing the edges 78, 80, 82, and 84, cutting along lines 86 and 88, folding the blank, and thereafter sealing the container along lines 86 and 88 as described above.

FIGURE 15 illustrates a further modification of forming the container from a single folded sheet of material 90. The container 14 is thereafter formed from a blank 26 in a similar manner as described above; again, the specific sequence of steps involved might vary. One method would involve the steps of folding the material as shown, sealing along the edge 92, cutting and sealing along the edges 94 and 96, cutting along the edges 98 and 100, folding the blank, and thereafter sealing the container along the edges 98 and 100 as described above.

It is envisioned that various shapes of the blank, and therefore the container, might be desired; therefore, the invention is not intended to be limited to the specific shape of the blank shown in FIGURE 6. The specific desired shape of the container might depend upon its intended use, the specific material used, and the like. It has been found that the shape of the blank illustrated in FIGURE 6, with its equilateral-shaped triangular surfaces, provides a suitable container or support structure for a corner reflector, as illustrated in FIGURE 1. Note that each triangular surface of the container encloses one corner of the reflector. FIGURE 16 illustrates a modified shape of the blank 26. In this embodiment, the blank 26 is comprised of four isosceles-shaped triangles 102, 104, 106, and 108. Although the resultant container derived by using this particular blank is an octahedron, it has a somewhat different shape than that of the container illustrated in FIGURES 11–13.

Figure 17:
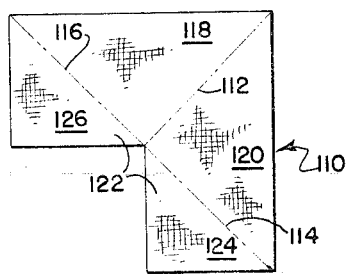
FIG. 17 illustrates a top view of a blank of a component or corner of the reflector.
Figure 18:
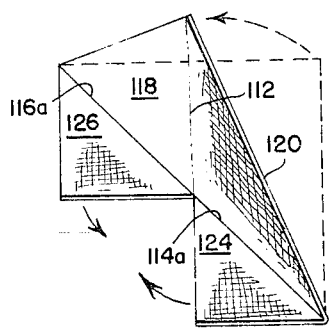
FIG. 18 is a perspective showing one portion of the blank illustrated in FIG. 17 folded 90°.
Figure 19:
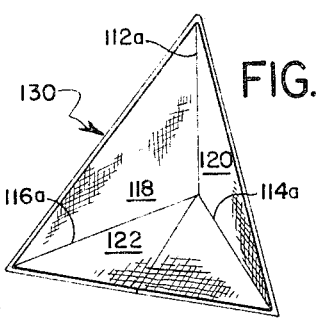
FIG. 19 is a perspective showing the blank of FIG. 18 folded into the shape of a trihedron.
Figure 20:
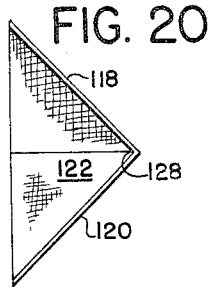
FIG. 20 is a top elevational view of the trihedron of FIG. 19.
Figure 21:
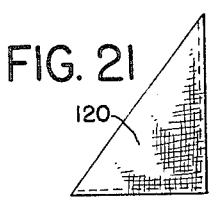
FIG. 21 is a side elevational view of the trihedron of FIG. 19.

FIGURE 17 illustrates a blank of a component or corner of a reflector, designated generally by reference numeral 110. The blank is formed from a square sheet of material having one-quarter section removed therefrom, and is folded along lines 114 and 116 which form a first diagonal or two partial diagonals from the respective corners to the midpoint of the blank, and along line 112 which forms another partial diagonal. Folding along lines 112, 114, and 116 produces three edges 112a, 114a, and 116a, respectively, thereby forming a trihedron or component having three triangular-shaped surfaces or panels 118, 120, and 122, and an inner apex 128. Surface 122 is formed by securing together the edges of two triangular sections or flaps 124 and 126. FIGURE 18 illustrates the blank folded along lines 114 and 116 to form edges 114a and 116a, respectively; and FIGURE 19 illustrates a trihedron or component 130 formed by the three plane surfaces 118, 120, and 122 after the blank has been folded along the line 112 to form the edge 112a, and the sections 124 and 126 secured together. FIGURES 20 and 21 show a top and side view respectively, of the trihedron illustrated in FIGURE 19.

As stated hereinbefore, corner reflectors are generally made of rigid sheet material, or of a flexible, collapsible material. Although the presently described method of making a corner reflector is particularly well adapted for making a corner reflector constructed of a flexible, collapsible material, it is also envisioned that this method might be used for making a reflector of rigid or semi-rigid material as well. If the material used is a flexible and collapsible material, the various trihedrons or components might be assembled and connected together by any suitable means, such as sewing, adhesives, sealing, or the like. On the other hand, if a rigid or semi-rigid material is used, the connections might be made by soldering, welding, or the like. The particular type of reflecting material used will depend upon the material available, the environment where the reflector is to be used, and the like. For purposes of illustration, the corner reflector of this invention is comprised of any commercially available mesh type material adapted to reflect microwaves to the source from which they were transmitted, and will not be described in detail.

Figure 22:
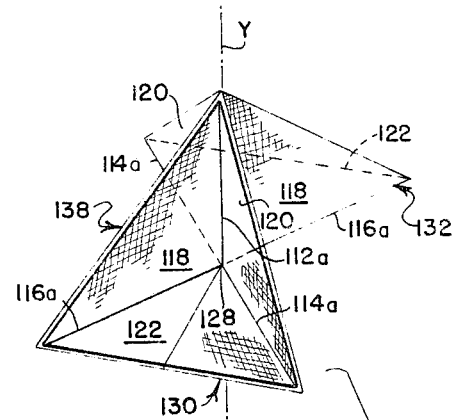
FIG. 22 is a perspective showing four trihedrons connected together to form two separate units.

FIGURE 22 illustrates two identical units of the corner reflector 12, designated generally by numerals 138 and 140. Unit 138 is comprised of two identical trihedrons or components 130 and 132 (for illustrative purposes, the edges and surfaces of each trihedron are designated by the same reference numerals), which are secured together by connecting the edge 112a of the trihedron 130 to the edge 112a of the trihedron 132, so that the inner apex 128 of trihedron 130 abuts against the inner apex of trihedron 132. Unit 140 is likewise comprised of two identical trihedrons 134 and 136, which are secured together by connecting the edge 112a of the trihedron 134 to the edge 112a of the trihedron 136, so that their respective inner apices 128 likewise abut against each other. As noted in FIGURE 22, the unit 140 is upside down relative to the unit 138, and is rotated about the Y axis, so that when the units are connected together, the surface 122 of each trihedron lies in the same plane. Construction of the corner reflector is completed by connecting the edges 114a and 116a of trihedrons 130 and 132 to the edges 114a and 116a respectively of the trihedrons 134 and 136. The completed reflector 12 includes eight inner corners or apices, and twenty-four reflecting surfaces, all formed by the three plane surfaces of the four trihedrons.

FIGURE 23 illustrates the four trihedrons of the corner reflector 12 separated from each other. Movement of the four trihedrons in the direction indicated by the arrows, results in a reflector having the inner apices 128 of the trihedrons symmetrically positioned with respect to a common center. FIGURE 24 shows a top view of the completed corner reflector (note that the plane formed by the surfaces 122 of the trihedrons describes a square having four corners 142, 144, 146, and 148).

An alternative method of constructing the reflector from the four blanks 110 would be to secure the edges 112a, 114a, and 116a of the four blanks together in the relative orientation shown in FIGURES 22 or 23, before the surface or panel 122 of each blank is formed by connecting the two flaps 124 and 126 together. This procedure enables the constructor of the reflector to make most of the connections before the inner corners or apices 128 are formed, therefore reducing the effort required to build the reflector.

FIGURE 25 shows a partially opened container 14 and a corner reflector 12 which has been extracted therefrom. The container 14 is constructed according to the principles described above, and illustrated in FIGURES 6–16; and the reflector 12 is likewise constructed according to the principles described above, and illustrated in FIGURES 17–24. The reflector 12 of FIGURE 25 is the same as the reflector shown in FIGURE 24, but illustrated as viewed along the line-of-sight indicated in FIGURE 24. Note that the apices or corners 150 and 152 are now visible, whereas the corner 146 is not.

The reflector 12 is inserted into the container or support structure 14 prior to inflation, and is suspended within the container 14 by means of tie-strings 16, which are connected to the inner six corners of the container by suitable means, such as sealing. As illustrated in FIGURE 25, apices or corners 150 and 152 of the corner reflector 12 are connected to apices 54 and 56, respectively, of the container 14; corners 144 and 148 of the reflector 12 are connected to corners 72 and 70, respectively, of the container 14; and corner 146 of the reflector 12 is connected to corner 40 of the container 14, prior to sealing the edges 46, 50 and 48, 52 of the container together. It should be understood however, that the reflector 12 might be revolved or rotated in any manner so that the particular corners of the reflector mentioned above, might be connected to different corners of the container 14. The corner 142 of the reflector is connected to the corner 68 (note FIGURE 10) of the container, preferably after partially sealing the container closed; however, if preferred, corner 142 can be connected to the corner 68 prior to sealing as well. After the last seal is made on the container or support structure 14 the support structure is inflated with a gaseous medium through valve 20 and the radar reflecting unit assumes a shape as depicted in FIGURE 1.

Figure 5:
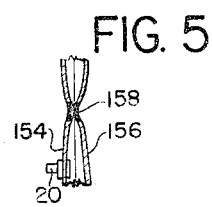
FIG. 5 is a partial sectional view showing the two layers of the embodiment depicted in FIG. 4.
Figure 4:
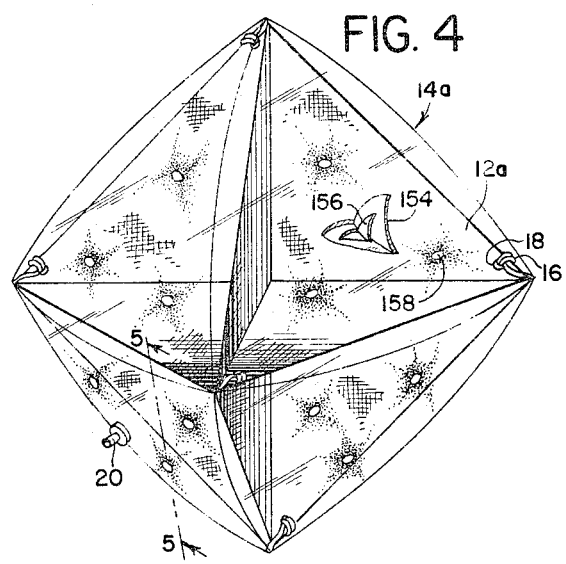
FIG. 4 is a perspective view illustrating a modified embodiment of the radar reflecting unit wherein the container is comprised of two layers.

FIGURE 4 illustrates a modification of the invention. In this embodiment, the container or support structure 14a is comprised of two layers of material 154 and 156 (note FIGURE 5) rather than a single layer. One of the primary advantages of this type of container or support structure is that the space between the two layers of material is inflated with a gaseous medium by means of valve 20, rather than inflating the entire container or support structure 14a. This provision permits a substantial saving in the amount of gaseous medium required to inflate the structure and support the corner reflector. A plurality of spot-seals or tufts 158 are provided to aid in reinforcing the structure. The spot-seals 158 are preferably made prior to inflation, and if desired, prior to inserting the corner reflector 12a. In this connection, it may be preferred to fill the space between the two layers of material with a hardenable foam substance in lieu of the gaseous medium, so that a rigid support structure is formed after the foam hardens. Foam substances of this nature are well known in the art and will not be described in detail.

In the above description and attached drawings, a disclosure of the principles of this invention is presented, together with some of the embodiments in which the invention may be carried out.

Now, therefore, I claim:

1. A support structure for a corner reflector comprising a collapsible container which includes a first layer of non-extensible material which forms a first envelope, and a second layer of non-extensible material which forms a second envelope, said second envelope being positioned within said first envelope, inlet means for filling the space between the two layers with an inflation medium, said medium being prevented from entering the second envelope, the container when inflated forming a polyhedron having a plurality of plane surfaces which intersect with each other to form a plurality of triangles having straight edges, and means for attaching the reflector within said container.

2. A radar reflector unit comprising corner reflector having a plurality of three-sided reflecting components connected together to form a plurality of inner apices, means for supporting said reflector comprising a container which includes first and second layers of material, means for connecting said layers together at a plurality of points, inlet means for filling the space between the two layers with an inflation medium, the container when inflated forming a multi-sided structure having a plurality of plane surfaces which intersect with each other to form a plurality of triangles having straight edges, and means for attaching the reflector within the container.

3. A support structure for a corner reflector comprising a collapsible container which includes a first layer of non-extensible material and a second layer of non-extensible material, said first layer of material being connected to the second layer of material at a plurality of points, thus providing a reinforced support structure for the corner reflector, inlet means for filling the space between the two layers with an inflation medium, the container when inflated forming a polyhedron having a plurality of plane surfaces which intersect with each other to form a plurality of triangles having straight edges, and means for attaching the reflector within said container.

References Cited by the Examiner

UNITED STATES PATENTS

| | | | |
|---|---|---|---|
| 2,570,549 | 10/1951 | Hansell | 343—18 |
| 2,752,594 | 6/1956 | Link et al. | 343—18 |
| 2,886,263 | 5/1959 | Ferguson | 244—31 |
| 2,888,675 | 5/1959 | Pratt et al. | 343—18 |
| 3,026,604 | 3/1962 | Boggs | 29—155.63 |
| 3,046,847 | 7/1962 | Voege et al. | 93—35 |
| 3,059,322 | 10/1962 | Teague | 29—155.5 |
| 3,063,656 | 11/1962 | Bohl et al. | 244—31 |
| 3,069,978 | 12/1962 | Hoeppner | 93—35 |
| 3,103,662 | 9/1963 | Gray et al. | 383—18 |

FOREIGN PATENTS 758,090    9/1956    Great Britain.

CHESTER L. JUSTUS, *Primary Examiner.*

C. F. ROBERTS, J. P. MORRIS, *Assistant Examiners.*